(12) United States Patent
Petersen et al.

(10) Patent No.: US 7,047,898 B2
(45) Date of Patent: May 23, 2006

(54) SYSTEM FOR CONTROLLING STREAMERS

(75) Inventors: Egil Petersen, Tokyo (JP); Rolf Ronningen, Kolsaas (NO); Svein J. Naley, Oslo (NO)

(73) Assignee: Petroleum Geo-Services AS, Lysaker (NO)

( * ) Notice: Subject to any disclaimer, the term of this patent is extended or adjusted under 35 U.S.C. 154(b) by 0 days.

(21) Appl. No.: 10/466,976

(22) PCT Filed: Jan. 22, 2002

(86) PCT No.: PCT/NO02/00032

§ 371 (c)(1),
(2), (4) Date: Jul. 23, 2003

(87) PCT Pub. No.: WO02/059650

PCT Pub. Date: Aug. 1, 2002

(65) Prior Publication Data

US 2004/0060498 A1    Apr. 1, 2004

(30) Foreign Application Priority Data

Jan. 24, 2001   (NO) .................................. 20010434

(51) Int. Cl.
*B63B 21/66*    (2006.01)
*G01V 1/38*    (2006.01)
(52) U.S. Cl. ...................... 114/244; 114/253
(58) Field of Classification Search ................ 114/242, 114/253, 254, 244; 367/14–20, 106, 130, 367/141, 153
See application file for complete search history.

(56) References Cited

U.S. PATENT DOCUMENTS

| 4,063,213 | A | * | 12/1977 | Itria et al. ...................... 367/17 |
| 4,087,780 | A | * | 5/1978 | Itria et al. ...................... 367/17 |
| 4,463,701 | A | | 8/1984 | Pickett et al. |
| 4,581,723 | A | | 4/1986 | Savit |
| 4,729,333 | A | | 3/1988 | Kirby et al. |
| 4,793,274 | A | * | 12/1988 | Regone ...................... 114/242 |
| 4,798,156 | A | * | 1/1989 | Langeland et al. ......... 114/242 |

(Continued)

FOREIGN PATENT DOCUMENTS

EP     0 018 053     4/1980

(Continued)

*Primary Examiner*—S. Joseph Morano
*Assistant Examiner*—Ajay Vasudeva
(74) *Attorney, Agent, or Firm*—E. Eugene Thigpen

(57) ABSTRACT

System for controlling cables and streamers in a seismic tow arrangement comprising at least one deflector (13) connected to one side of a tow vessel (10) via at least one wire (12), leading or the like, wherein the deflector is located in a position at a distance perpendicularly to the direction of movement (5) of the tow vessel, the vessel being equipped with a navigation system for measuring the position of the vessel. The system is characterised by comprising a command unit and a number of control units, where the control units are located on at least some of the streamers and are adapted to measure and report about their positions, that the command unit comprises means for receiving the position information from each individual control unit and calculation of possible deviations from predetermined positions, and that the system comprises means for changing the position of the streamers for re-establishing the positions of the control units.

13 Claims, 4 Drawing Sheets

U.S. PATENT DOCUMENTS

| | | | |
|---|---|---|---|
| 4,809,005 A | 2/1989 | Counselman, III | |
| 4,890,568 A | 1/1990 | Dolengowski | |
| 4,992,990 A * | 2/1991 | Langeland et al. | 367/19 |
| 5,052,814 A * | 10/1991 | Stubblefield | 367/15 |
| 5,532,975 A * | 7/1996 | Elholm | 367/16 |
| 5,790,472 A * | 8/1998 | Workman et al. | 367/19 |
| 6,011,753 A * | 1/2000 | Chien | 367/21 |
| 6,074,253 A * | 6/2000 | Brinchmann-Hansen | 439/624 |
| 6,234,102 B1 * | 5/2001 | Russell et al. | 114/253 |
| 6,504,792 B1 * | 1/2003 | Barker | 367/20 |
| 6,590,831 B1 * | 7/2003 | Bennett et al. | 367/16 |
| 6,671,223 B1 * | 12/2003 | Bittleston | 367/19 |
| 6,681,710 B1 * | 1/2004 | Semb | 114/244 |
| 6,691,038 B1 * | 2/2004 | Zajac | 702/14 |

FOREIGN PATENT DOCUMENTS

| | | |
|---|---|---|
| GB | 2 047 406 | 4/1980 |
| GB | 2047406 A * | 11/1980 |
| GB | 2 087 556 | 10/1981 |
| NO | 158970 | 4/1980 |
| WO | WO 84/03153 | 4/1984 |
| WO | WO 98/25162 | 6/1998 |
| WO | WO 99/04293 | 1/1999 |
| WO | WO 200020895 A1 * | 4/2000 |
| WO | WO 01/16623 | 3/2001 |
| WO | WO 200155747 A1 * | 8/2001 |
| WO | WO 2003100451 A2 * | 12/2003 |

* cited by examiner

SYSTEM FOR CONTROLLING STREAMERS

This invention relates to a system and a method for controlling seismic towed arrangements with a towing vessel equipped with a navigation system for measuring the position of the vessel.

In seismic prospection at sea there is most often employed a number of seismic cables being towed behind a vessel. The prospecting of the geological formations in the seabed is carried out by having one or more acoustic sources emitting sound waves downwards into the seabed where they are reflected at the transition between different types of formations. The reflected signals are received by sensors mounted in the seismic cables or streamers. The cables are towed along a selected path in order to investige a given area. The movements of the vessel and the seismic tow arrangement must be controlled accurately in order to secure coverage of the desired areas.

Exact control of the positions of the vessel and the towed arrangement is particularly important when the same reflection point shall be investigated several times, in order to improve the measurements. This can be done by controlling the time between the emitted acoustic signals in relation to the distance between the sensors along each streamer, and the speed of the vessel, so that the next signal is reflected from the reflection point upwards to a subsequent sensor in the direction of movement along the same streamer.

In order to secure accurate measurements it has been common to monitor the position of the vessel by means of existing navigation systems, for correcting the position. It has been found, however, that it is difficult to obtain a sufficient degree of accuracy, among other things, due to the dimensions and the large inertia of the vessels. Various systems have also been employed to compensate for errors, for example by means of signal processing, oversampling or by controlling the deflectors which pull the seismic streamers laterally out from the vessel; this increases the complexity of the system, in that control signals and power, inter alia, must be conveyed from the vessel to the deflectors.

U.S. Pat. No. 4,781,140 relates to a system for compensation of the orientation of the vessel in relation to the direction of movement. The seismic streamers are connected to rigid beams the orientation of which, with respect to the vessel, is changed by means of wires when for example the vessel is directed against the wind or the stream. This however, does not involve any possibility of compensating for deviations in the position of the vessel in relation to an intended course.

Other examples of devices and systems for keeping a seismic streamer in a correct position are found in U.S. Pat. No. 4,711,194, U.S. Pat. No. 4,222,340, U.S. Pat. No. 3,961,303 and U.S. Pat. No. 3,943,483 as well as U.S. Pat. No. 5,790,472.

The towed seismic arrangement usually comprises a number of control units located along each streamer, for example in order to keep the streamer at a certain depth or position. A main problem with the known solutions for controlling seismic streamers is that the control of the control units being mounted along each cable is not coordinated. This means that the control units adjust the streamer position independently of one another, and this can have the consequence that the units do not react in an optimal manner in terms of counteracting a position disturbance in the streamer system. Such disturbances can for example be caused by an unstable path control of the towing vessel, and turbulence from the towed equipment and the towing vessel.

The present invention has its main object to provide a control system for seismic streamers, which coordinates the effect of the control units so that the position regulation is at an optimum at all times, and also with respect to energy consumption. It is also an object of this invention to provide a system that can employ existing control units, so that large and expensive reconstructions are avoided.

These objects are obtained by means of a system as stated in the attached independent claim.

The invention will be described more closely below with reference to the accompanying drawings, illustrating the invention by way of examples.

Figure 4:
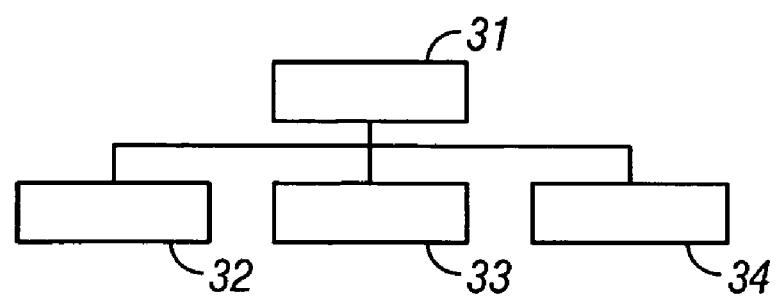
Figure 5:
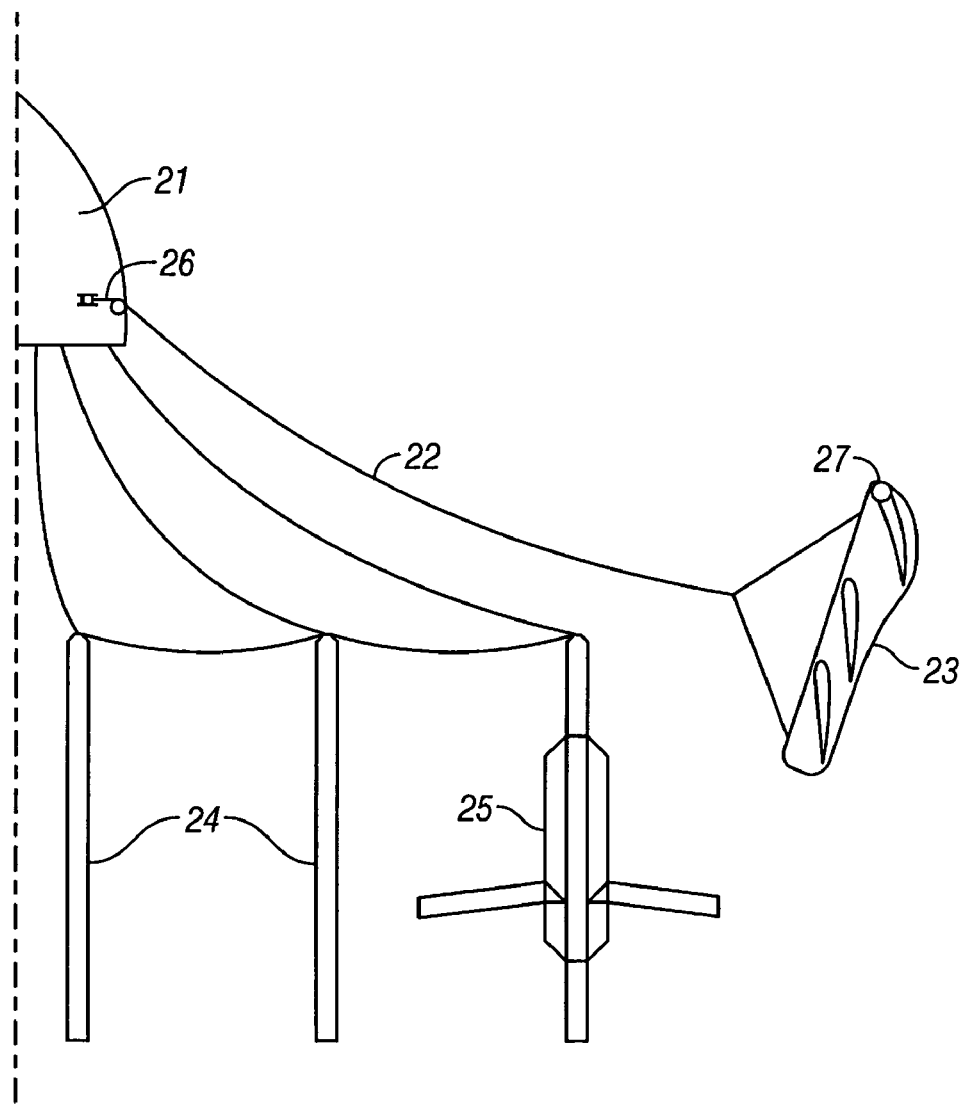

FIG. 4 schematically illustrates the input of information to the control unit;

FIG. 5 schematically illustrates components of the system for controlling cables and streamers according to the invention.

Figure 1:
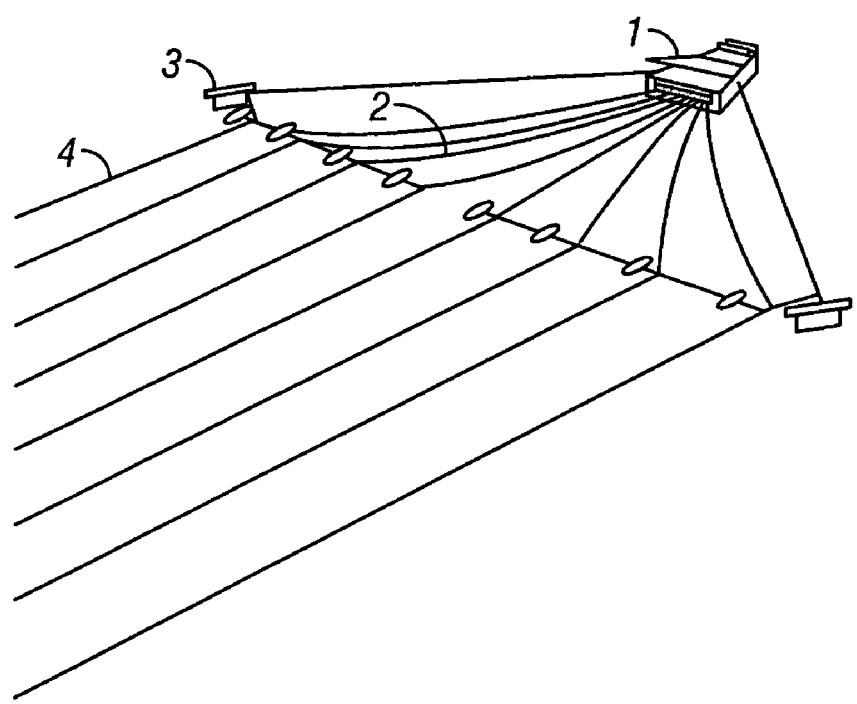
FIG. 1 illustrates the movements of a seismic prospecting vessel according to prior art.

FIG. 1 illustrates how a seismic prospecting vessel 1 according to the prior art can move under the influence of various wind and stream conditions. The vessel 1 is connected to a seismic tow arrangement 2,3,4 comprising tow cables 2 and deflectors 3 which pull out the arrangement laterally in relation to the towing direction, and seismic streamers 4 comprising sensors, such as hydrophones. Besides, the towed arrangements comprises seismic sources being connected directly to the vessel 1.

In FIG. 1 the vessel shall follow a predetermined course, but because of wind and stream conditions, the real movement will deviate there from. The control system that compensates for the deviations will normally result in an oscillating movement about the predetermined course. The seismic towed arrangement, being connected to the vessel with towing cables, lead-ins or the like 2 having fixed lengths, will follow the movements of the vessel.

Figure 2:
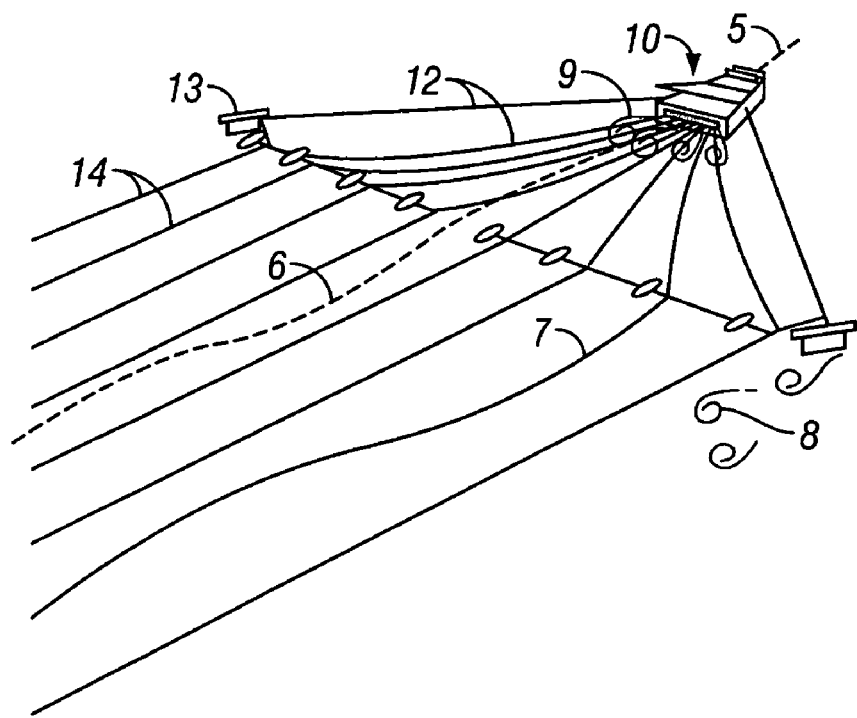
FIG. 2 illustrates the movements of a seismic prospecting vessel according to the invention.

In FIG. 2 the vessel 10 (compare 1, FIG. 1) shall follow a predetermined course 5, but because of, inter alia, environmental disturbances (wind, stream and wave conditions) the true movements will usually deviate there from. The control system of the vessel that compensates for the environmental effect or influence, usually will result in an oscillating movement about the predetermined course, which is illustrated by the true path 6 of the vessel. The seismic towed arrangement will be influenced by an unstable path control both in the horizontal and depth plane 7. Turbulence 8 from the deflectors and the propeller wake and turbulence 9 from the towing vessel will also give rise to position disturbances of the seismic streamers.

In FIG. 2 the vessel 10 according to the invention, is provided with devices changing the length of the towing cable in response to changes in the position of the vessel in relation to the predetermined course 6. This solution is more closely described in international patent publication No. WO 01/16623. WO 01/16623 describes a system for controlling seismic arrays in a marine seismic survey, comprising at least one deflector on one side of a towing vessel coupled through a wire, lead-in or similar, with the deflector being placed in a position with a distance perpendicular to the direction of movement of the towing vessel, and the towing vessel being equipped with a navigation system for measuring the position of the vessel. The vessel contains a calculation means for calculating deviations in the movement of the vessel relative to a predetermined course, based on the position of the vessel. The wire is coupled to the towing vessel through control devices for varying the wire length from the towing vessel to the deflector. The control devices are coupled to the calculation means for adjusting the wire length depending on said deviations in said vessel position, thus to counteract corresponding deviations in the movement of the deflector. The control devices are preferably available equipment such as winches for taking in or out the tow wire, suitable for connecting to the control system. For control over the position of the seismic arrays, the vessel is provided with devices for measuring the positions of one or more of the deflectors, relative to the vessel. Then the measured deviation in the vessel's position may be compensated for by letting out or in a sufficient amount of wire until the deflector has the correct position, both globally and relative to the vessel. For increased precision, known means are provided so that the heave, roll, and pitch movements of the vessel may be measured and the control devices are adapted to compensate for these movements.

Other solutions for changing the horizontal position can be per se well known adjustable deflectors which can regulate the distance to the vessel by changing the lift capacity. An example of such an active deflector is shown in international patent publication No. WO 98/25162. WO 98/25162 describes a deflector for towing after a vessel, especially for use in relation to seismic surveys, being adapted to pull equipment to a transversal position in relation to the moving direction of the vessel, comprising at least one connection point for connecting, through wires or similar, to the vessel and the equipment to be towed. Two or more deflector wings are adapted to provide the deflector with a lifting force transversally in relation to the moving direction of the vessel. At least one of the wings is provided with a rotating cylinder positioned in front of the wing adapted to increase the lift of the deflector wing and a drive unit for driving the rotating cylinder with corresponding devices for power supply. The rotational velocity of the rotating cylinder may be controlled to adjust the lift of the deflector.

In a corresponding manner the depth can be adjusted by means of depth controllers as known per se, for example as described in international patent publication No. WO 99/04293. WO 99/04293 describes a collapsible depth controller for mounting in relation to seismic cables or similar devices, comprising two wings, each being rotatably connected to a main body relative to a first axis of rotation perpendicular to the longitudinal direction of the depth controller, to be folded into a fitted room in the main body of the depth controller. The depth controller comprises a first motor for rotation of an at least partially cylindrically shaped cam plate relative to it axis, the axis essentially corresponding to the longitudinal axis of the depth controller, said cam plate comprising at least one path or cam which along at least part of its length has an angular extension relative to the axis of the cam plate, at least one cam follower engaging into said cam plate and comprising a first coupling device for rotatable connection to the wings, where the first coupling device is positioned at a chosen distance from the first rotational axis of the wing. Each wing is also rotatably connected to the depth controller relative to a second axis, and the wing in a chosen distance from this axis is connected to a second cam follower engaging in the cam plate to provide for rotation of the wing relative to the second axis when rotating the cam plate. The depth controller comprises a coaxial core being firmly mounted in the cable, and a second motor for rotation of the main body of the depth controller relative to the core. Rotation of the cam plate can move the second cam follower to lead to a rotation of the wing relative to the second axis, which may be used to change the angle of the wing and thus the lift of the depth controller.

In a usual way vessel 10 is equipped with navigation systems, for example GPS (Global Positioning System), that measures the deviations in relation to the predetermined course, and which can be used to compensate for deviation in the movements of the vessel. Since it is substantially easier and quicker to pull in or pay out the towing wire, than it is to adjust the position of the vessel, the position of the towed arrangement can be changed more quickly than the position of the vessel. Thus, the seismic towed arrangement can maintain a more stable course than the towing vessel 10 itself.

For exact control of the position of the seismic towed arrangement, the vessel is provided with devices for measuring the positions of one or more parts of the towed arrangement, for example the deflectors, in relation to the vessel. Thereby, a measured deviation of the position of the vessel can be compensated for directly by paying out or pulling in a sufficient amount of cable, and/or by adjusting the lift capacity of the deflectors, until the deflector has a correct position both globally and with respect to the vessel 10. In a corresponding manner regulation of depth controllers will adjust the depth deviation of the streamer.

Compensation for the transverse deviation by changing the cable length only, can lead to a relative displacement of the deflectors in the direction of movement, thus giving rise to changes in the positions of the seismic streamers mutually. This can constitute a problem in data acquisition, and can therefore be compensated for in other ways, for example by regulating the length of the deployed seismic streamers or by employing active deflectors which increase the lifting capacity so that the variation of the deployed streamer length will be smaller, whereas the lifting effect of the deflectors is used to maintain a more regular position in relation to the direction of the movement of tow vessel.

In addition, for obtaining an increased accuracy, the heave, roll and pitch movement of the vessel can be measured and compensated for according to the invention.

In the preferred embodiment of the invention the system comprises a deflector 13 at either side of the vessel 10, whereby the adjustment comprises at least the tow cables 12 to the deflectors, but can also comprise the other wires, streamers or lead-ins. This will also involve a possibility of adjusting the seismic streamers' position in the direction of movement to compensate for the displacement that otherwise would be a consequence of the length change of the tow cable 12 to the deflector 13. FIG. 2 shows a tow situation where the seismic streamers 14 are connected to one another and to the deflectors with cables which thus results in the desired spacing of the streamers. It is of course possible to subdivide the towed arrangement into several parts or sections, each being provided with one or more deflectors, and where the position of each of these parts or sections can be adjusted in order to maintain the seismic towed arrangement at a predetermined course.

Figure 3:
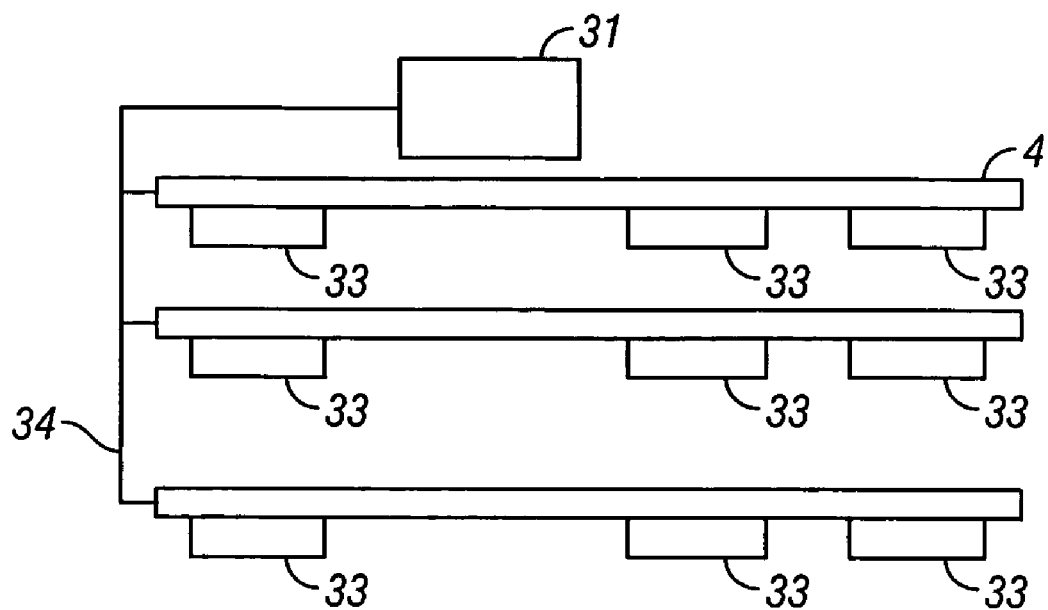
FIG. 3 shows the control system for coordinated control of the control units according to the invention.

FIG. 3 shows the control system for coordinated control of the control units 33 according to the invention. The control system comprises a command unit 31 which monitors each individual control unit 33 for one or more seismic streamers 14. The control units can measure a number of parameters, such as power or effect, depth or position, in a manner known per se for each of these. The control units can be located in the leading ends of the streamers, as is common today, or along each streamer, and can consist of conventional depth controllers "birds" with measuring devices, or they can be of a more sophisticated kind.

The command unit 31 comprises calculating means for calculating of optimum power or effect (control power) for each individual control unit in relation to a predefined position and known parameters for the control unit 33. This information is processed and possible signals regarding a change of the positions of the streamer and the control units, are sent to one or more of the above means or devices.

The signal transfer to and from the command unit can be via electrical or optical conductors 34 in cables or lead-ins, or can be conveyed via radio or acoustic signals.

With reference to FIG. 4 the command unit 31 receives signals from the control units 33 based on measurement methods known per se, in order to maintain depth, effect or power, and position. For example can depth be measured by pressure measurement, power or effect by means of measurements of fin or wing angle of a sensor, and position by means of a compass or via acoustic measurement methods in order to determine relative positions between the cables or streamers. Additionally also position measurements and possibly other measurements can be performed from instruments 34 mounted in the streamer itself.

Besides, as mentioned above, the tow vessel comprises navigation aids 32 being connected to the command unit 31 in order to supply information thereto, for example regarding global position (via satellite navigation systems or the like), movement, gyro and the like, so that the positions of the streamers with respect to the movements of the vessel and the geological formations to be investigated, can be controlled.

The actual control can take place by having the planned movement of the seismic tow arrangement in the form of position, the depth of the streamers and so forth stored in the command unit, and information regarding the real positions thereof being calculated on the basis of the global position of the vessel and the measurements from the individual control units. Deviations from the desired positions are recorded and the different control devices, as for example active deflectors, winches, depth controllers and the like, are activated individually in relation to the desired positions of the various parts or sections of the tow arrangement.

FIG. 5 schematically illustrates components of the system for controlling cables and streamers according to the invention. The vessel 21 tows streamers 24 by means of tow wires 22. At least one control unit 33 (see FIGS. 3 and 4) comprises a depth measuring instrument. A depth controller 25 is connected to a streamer 24 for adjusting the vertical position of the streamer 24. A control device 26 is adapted to vary the tow wire 22 length from the tow vessel 21 to the deflector 23. The deflector 23 contains means 27 for adjusting the lifting capacity of the deflector 23 for adjusting the position of the deflector 23.

Although the figures of drawings show a symmetrical tow arrangement, it is of course possible to take advantage of the invention in the case of asymmetric tow arrangements, for example in the case of several vessels together forming a seismic tow arrangement. A solution wherein the whole tow arrangement is located at one side of the vessel, can also be contemplated, for example in prospecting near land, where the vessel must be kept at a certain distance from the shore.

Although the invention is primarily described here for the purpose of compensating for drift with respect to a predetermined course, it is obvious that it can also be employed for keeping the seismic tow arrangement along a predetermined path, whereas the vessel for example makes manoeuvres in order to avoid obstacles. For example there may be the case of a river where the possible sailing path is not necessarily straight.

What is claimed is:

1. A system for controlling cables and streamers in a seismic tow arrangement comprising
    at least one deflector (13) connected to one side of a tow vessel (10) by at least one tow wire (12), wherein the deflector is located at a position with a distance perpendicular to the direction of movement (5) of the tow vessel, the vessel being equipped with a navigation system (32) for measuring the position of the vessel,
    a command unit (31) and
    a plurality of control units (33), the control units being located on at least some of the streamers (14) and being adapted to measure and report their own positions,
    wherein the command unit (31) comprises
        means for calculating deviation in the position of the tow vessel;
        means for receiving position information from each control unit (33); and
        means for calculating deviations from predetermined positions of the control units, based upon the received position information from the control units,
    and the system comprises
        means for changing the position of the streamers in order to restore the positions of the control units, to maintain the streamer at a given depth and position, including control devices for varying the length of the tow wire (12), to vary the transverse position of the deflector (13) with respect to the vessel (10), based upon the received position information from the control units and the calculated deviation in the position of the tow vessel,
        and means for coordinating the control units in changing the position of the streamers.

2. The system according to claim 1, wherein the position information from at least one control unit (33) comprises horizontal and vertical position.

3. The system according to claim 1, wherein the command unit (31) comprises means for measuring the relative position of the deflector (13) with respect to the vessel (10), and adjustment comprises control of the global position of the deflector based on the position of the tow vessel and the relative position of the deflector with respect to the vessel.

4. The system according to claim 1, wherein at least one control unit (33) comprises a depth measuring instrument and the means for changing the position of the streamers comprises at least one depth controller, for adjusting the vertical position of the streamers.

5. The system according to claim 1, wherein, the tow wire (12) is connected to the tow vessel (10) via control devices-adapted to vary the tow wire length from the tow vessel to the deflector (13) and the control devices are in contact with the means for calculating deviation, to adjust the wire length on the basis of said deviation in the position of the tow vessel, in order to counteract corresponding deviations in the movement of the deflector.

6. The system according to claim 5, wherein the control device adapted to vary the tow wire length from the tow vessel (10) to the deflector (13) is a winch.

7. The system according to claim 1, wherein the command unit (31) also comprises means for measuring deviations in the orientation of the vessel.

8. The system according to claim 7, wherein the measured deviations in the orientation of the vessel are roll, heave and pitch.

9. The system according to claim 1, further comprising means for adjusting the lifting capacity of the deflector (13) for adjusting the position of the deflector.

10. The system according to claim 1, wherein the streamer (14) comprises means (33) for measuring the position of the streamer, and means for transmitting the position of the streamer to the command unit.

11. The system according to claim 1, wherein the control units (33) are located at selected points on the streamers (14), the deflectors (13) and the depth controllers, for measuring selected variables at each control unit.

12. The system according to claim 11, wherein the measured selected variables are lifting capacity, position and depth.

13. The system according to claim 1, wherein the tow wire (12) by which at least one deflector (13) is connected to one side of the tow vessel (10) is a lead-in wire.

* * * * *

UNITED STATES PATENT AND TRADEMARK OFFICE
CERTIFICATE OF CORRECTION

| | | |
|---|---|---|
| PATENT NO. | : 7,047,898 B2 | Page 1 of 1 |
| APPLICATION NO. | : 10/466976 | |
| DATED | : May 23, 2006 | |
| INVENTOR(S) | : Egil Pedersen, Rolf Rønningen and Svein J. Naley | |

It is certified that error appears in the above-identified patent and that said Letters Patent is hereby corrected as shown below:

Title page, Item (75), the inventor's name "Egil Petersen" should be --Egil Pedersen--

Title page, Item (75), the inventor's name "Rolf Ronningen" should be --Rolf Rønningen--

Signed and Sealed this

Nineteenth Day of September, 2006

JON W. DUDAS
*Director of the United States Patent and Trademark Office*